United States Patent
Mizumaki et al.

(10) Patent No.: US 8,063,919 B2
(45) Date of Patent: Nov. 22, 2011

(54) DISPLAY DEVICE AND INSTRUMENT PANEL AND AUTOMOBILE INCORPORATING THE SAME

(75) Inventors: Hidetaka Mizumaki, Nara (JP); Makoto Miyago, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1144 days.

(21) Appl. No.: 11/109,932

(22) Filed: Apr. 19, 2005

(65) Prior Publication Data

US 2005/0237345 A1    Oct. 27, 2005

(30) Foreign Application Priority Data

Apr. 21, 2004 (JP) ................ 2004-125456
Oct. 6, 2004 (JP) ................ 2004-293688

(51) Int. Cl.
G09G 3/36 (2006.01)
(52) U.S. Cl. .......................................... 345/690
(58) Field of Classification Search .......... 345/204, 345/205, 206
See application file for complete search history.

(56) References Cited

U.S. PATENT DOCUMENTS

| | | | |
|---|---|---|---|
| 5,764,139 A | 6/1998 | Nojima et al. | |
| 5,975,728 A | 11/1999 | Weyer | |
| 6,236,792 B1* | 5/2001 | Fung | 385/115 |
| 6,243,059 B1* | 6/2001 | Greene et al. | 345/88 |
| 2002/0044143 A1 | 4/2002 | Kota et al. | |
| 2002/0113781 A1* | 8/2002 | Ishiyama | 345/204 |
| 2003/0071769 A1* | 4/2003 | Sullivan et al. | 345/63 |
| 2003/0146893 A1 | 8/2003 | Sawabe | |

FOREIGN PATENT DOCUMENTS

| | | |
|---|---|---|
| EP | 1517289 A1 | 3/2005 |
| JP | 09-123848 | 5/1997 |
| JP | 2002-287726 A | 10/2002 |
| JP | 2003-177715 | 6/2003 |
| JP | 2003-280578 A | 10/2003 |

OTHER PUBLICATIONS

Official communication issued in counterpart European Application No. 05252463.4, mailed on Nov. 5, 2007.

* cited by examiner

*Primary Examiner* — Tammy Pham
(74) *Attorney, Agent, or Firm* — Keating & Bennett, LLP

(57) ABSTRACT

A display device includes a display panel for displaying information, and a driving circuit for driving the display panel. The driving circuit of the display device is capable of changing, with a lapse of display time, a displayed color of information which is statically displayed on the display panel.

26 Claims, 7 Drawing Sheets

30: SIGNAL PROCESSING SECTION

DISPLAY DEVICE AND INSTRUMENT PANEL AND AUTOMOBILE INCORPORATING THE SAME

BACKGROUND OF THE INVENTION

1. Field of the Invention

The present invention relates to a display device, and more particularly, the present invention relates to a display device for use in an instrument panel to be mounted in an automotive vehicle or for amusement purposes. Moreover, the present invention also relates to an instrument panel and an automotive vehicle incorporating such a display device.

2. Description of the Related Art

Conventionally, an instrument panel of a car may carry various instruments such as a speedometer. However, it has been proposed to provide, instead of such conventional instruments, a display device such as a liquid crystal display device or a CRT on an automotive vehicle instrument panel. Such a display device may be used to display information which is necessary for driving (see, for example, Japanese Laid-Open Patent Publication No. 9-123848).

Moreover, display devices such as liquid crystal display devices and CRTs are often provided in video game machines, pachinko (Japanese pinball) machines, pachinko-slot machines, and the like, thus being used for amusement purposes.

When a display device is used for an instrument panel or for amusement purposes, the display is based on man-made contents, typically resulting in a portion for displaying a fixed background or the like (a portion where information is to be displayed in a static manner) and a portion for displaying information containing motions or changes (a portion where information is to be displayed in a dynamic manner). Among the two portions, "burn-in" of images ("image persistence") is likely to occur in the former portion (i.e., the portion where information is to be displayed in a static manner).

Japanese Laid-Open Patent Publication No. 2003-177715 discloses a technique for preventing burn-in of images on a display device. This technique uses a display device having a displayable area which is broader than the actual image display area, such that display areas are sequentially switched from one another with a predetermined timing.

However, the technique disclosed in Japanese Laid-Open Patent Publication No. 2003-177715 cannot be adopted for a display device for an instrument panel because a display device for an instrument panel is supposed to display information which is necessary for driving an automotive vehicle. If the displayed position of such information changes, the driver will be distracted and confused, and the driver will not be able to readily locate desired information, thus resulting in a delayed or unsuccessful delivery of information to the driver.

The technique disclosed in Japanese Laid-Open Patent Publication No. 2003-177715 cannot be adopted for a display device for amusement purposes, either. Similarly, if the displayed position of information changes, the player will be distracted and confused, and the player will not be able to readily locate desired information, thus resulting in a delayed or unsuccessful delivery of information, which is a serious complication for game play.

In the case of a display device for a personal computer, it is commonplace to run a program (called a "screen saver") which causes the display to black out or display simple animations following a period of inactivity, in order to prevent burn-in of images. However, a display device for an instrument panel or a display device for amusement purposes as described above is always required to display information, thus making it impractical to use a screen saver in such applications.

SUMMARY OF THE INVENTION

In order to overcome the problems described above, preferred embodiments of the present invention provide a display device which prevents burn-in of images without causing a delayed delivery of information to a viewer, and an instrument panel and an automotive vehicle including such a display device.

According to a preferred embodiment of the present invention, a display device includes a display panel for displaying information, and a driving circuit arranged to drive the display panel, wherein the driving circuit is capable of changing, with a lapse of display time, a displayed color of information which is statically displayed on the display panel.

In a preferred embodiment, the driving circuit is capable of effecting the change in the displayed color in a discontinuous manner.

In a preferred embodiment, the driving circuit is capable of effecting the change in the displayed color in a gradual manner.

In a preferred embodiment, the driving circuit does not change, with a lapse of display time, a displayed position of the information which is statically displayed on the display panel.

In a preferred embodiment, the driving circuit preferably includes a first memory arranged to store information to be statically displayed on the display panel, a second memory arranged to store information to be dynamically displayed on the display panel, and a color conversion section arranged to change the displayed color of the information which is statically displayed on the display panel.

Alternatively, another preferred embodiment of the present invention is directed to a display device including a display panel for displaying information, and a driving circuit arranged to drive the display panel, wherein the driving circuit includes a first memory arranged to store information to be statically displayed on the display panel, a second memory arranged to store information to be dynamically displayed on the display panel, and a color conversion section arranged to change a displayed color of information which is statically displayed on the display panel.

In a preferred embodiment, the display panel includes a plurality of pixels in a matrix arrangement, and each of the plurality of pixels includes a first color dot corresponding to a first color, a second color dot corresponding to a second color, and a third color dot corresponding to a third color.

In a preferred embodiment, the change in the displayed color is effected by changing a luminance of one of the first color dot, the second color dot, and the third color dot.

In a preferred embodiment, the change in the displayed color is effected by varying display signal voltages supplied from the driving circuit to the first color dot, the second color dot, and the third color dot.

In a preferred embodiment, the first color dot is an R dot corresponding to a red color, the second color dot is a G dot corresponding to a green color, and the third color dot is a B dot corresponding to a blue color, and the change in the displayed color is effected so as to compensate for a change in tristimulus values X, Y, and Z of the XYZ colorimetric system caused by a change in the luminance of one of the R dot, the G dot, and the B dot, the compensation being made by a change in the luminances of the other two of the R dot, the G dot, and the B dot.

In a preferred embodiment, each of the plurality of pixels includes a further first color dot corresponding to the first color, a further second color dot corresponding to the second color, and a further third color dot corresponding to the third color.

In a preferred embodiment, the display panel includes a plurality of pixels arranged in a matrix configuration, and each of the plurality of pixels includes a plurality of subpixels each including a first color dot corresponding to a first color, a second color dot corresponding to a second color, and a third color dot corresponding to a third color.

In a preferred embodiment, the first color dot is an R dot corresponding to a red color, the second color dot is a G dot corresponding to a green color, and the third color dot is a B dot corresponding to a blue color, and the change in the displayed color is effected so as to compensate for a change in tristimulus values X, Y, and Z of the XYZ calorimetric system caused by a change in the luminance of one of the plurality of subpixels, the compensation being made by a change in the luminance of another of the plurality of subpixels.

Alternatively, another preferred embodiment of the present invention is directed to a display device including a display panel for displaying information, and a driving circuit arranged to drive the display panel, wherein, the display panel includes a plurality of pixels arranged in a matrix configuration, each of the plurality of pixels includes a plurality of subpixels each including a first color dot corresponding to a first color, a second color dot corresponding to a second color, and a third color dot corresponding to a third color, and the driving circuit switches, with a lapse of display time, gray scale levels displayed by the first, second, and third color dots included in at least one of the plurality of pixels which is statically displaying information, between the plurality of subpixels.

In a preferred embodiment, the display device is a display device for an instrument panel to be mounted in an automotive vehicle.

The present invention is also directed to an instrument panel including any of the aforementioned display devices.

The present invention is also directed to an automotive vehicle including the aforementioned instrument panel.

The present invention is also directed to a method for driving a display device having a display panel for displaying information, the method including a first step of statically displaying information in a portion of the display panel and dynamically displaying information in another portion of the display panel, wherein the first step includes a second step of changing, with a lapse of display time, a displayed color of the information which is statically displayed on the display panel.

In a preferred embodiment, the second step is performed so that the displayed color is changed discontinuously.

In a preferred embodiment, the second step is performed so that the displayed color is changed gradually.

In a preferred embodiment, the second step is performed such that a displayed position of the information which is statically displayed on the display panel is not changed with a lapse of display time.

In a preferred embodiment, the display panel includes a plurality of pixels arranged in a matrix configuration, each of the plurality of pixels includes an R dot corresponding to a red color, a G dot corresponding to a green color, and a B dot corresponding to a blue color, and the second step is performed so as to compensate for a change in tristimulus values X, Y, and Z of the XYZ calorimetric system caused by a change in the luminance of one of the R dot, the G dot, and the B dot, the compensation being made by a change in the luminances of the other two of the R dot, the G dot, and the B dot.

In a preferred embodiment, the display panel includes a plurality of pixels arranged in a matrix configuration, each of the plurality of pixels includes a plurality of subpixels each including an R dot corresponding to a red color, a G dot corresponding to a green color, and a B dot corresponding to a blue color, and the second step is performed so as to compensate for a change in tristimulus values X, Y, and Z of the XYZ colorimetric system caused by a change in the luminance of one of the plurality of subpixels, the compensation being made by a change in the luminance of another of the plurality of subpixels.

Alternatively, another preferred embodiment of the present invention provides a method for driving a display device having a display panel for displaying information, wherein the display panel includes a plurality of pixels arranged in a matrix configuration, and each of the plurality of pixels includes a plurality of subpixels each including a first color dot corresponding to a first color, a second color dot corresponding to a second color, and a third color dot corresponding to a third color, the method including a first step of statically displaying information in a portion of the display panel and dynamically displaying information in another portion of the display panel, wherein the first step includes a second step of switching, with a lapse of display time, gray scale levels displayed by the first, second, and third color dots included in at least one of the plurality of pixels which is statically displaying information, between the plurality of subpixels.

A driving circuit included in a display device according to a preferred embodiment of the present invention is capable of changing, with a lapse of display time, the displayed color of information which is displayed on a display panel in a static manner. Therefore, according to various preferred embodiments of the present invention, burn-in of images can be prevented without causing a delayed delivery of information to a viewer.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. It is to be understood that the present invention is not limited to the following preferred embodiments.

Figure 1:
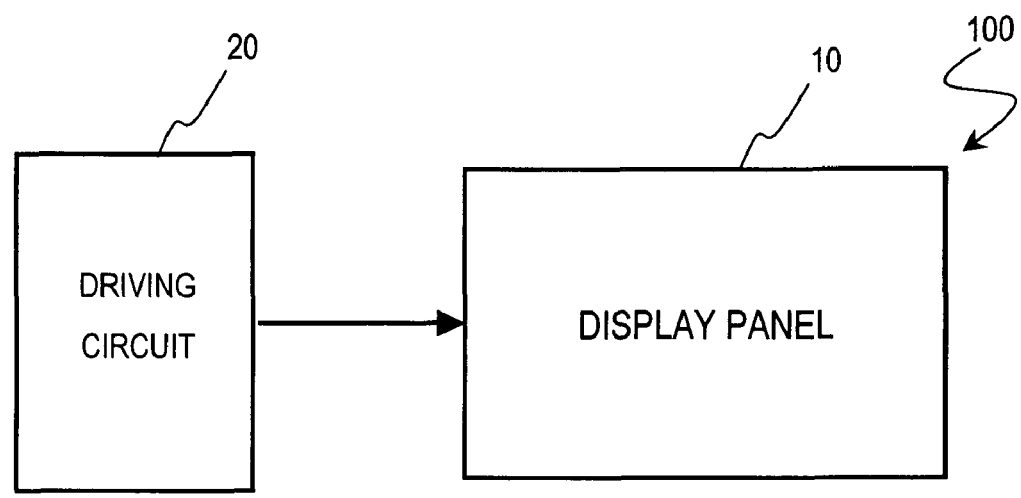
FIG. 1 is a block diagram schematically showing a display device 100 according to a preferred embodiment of the present invention.
Figure 2:
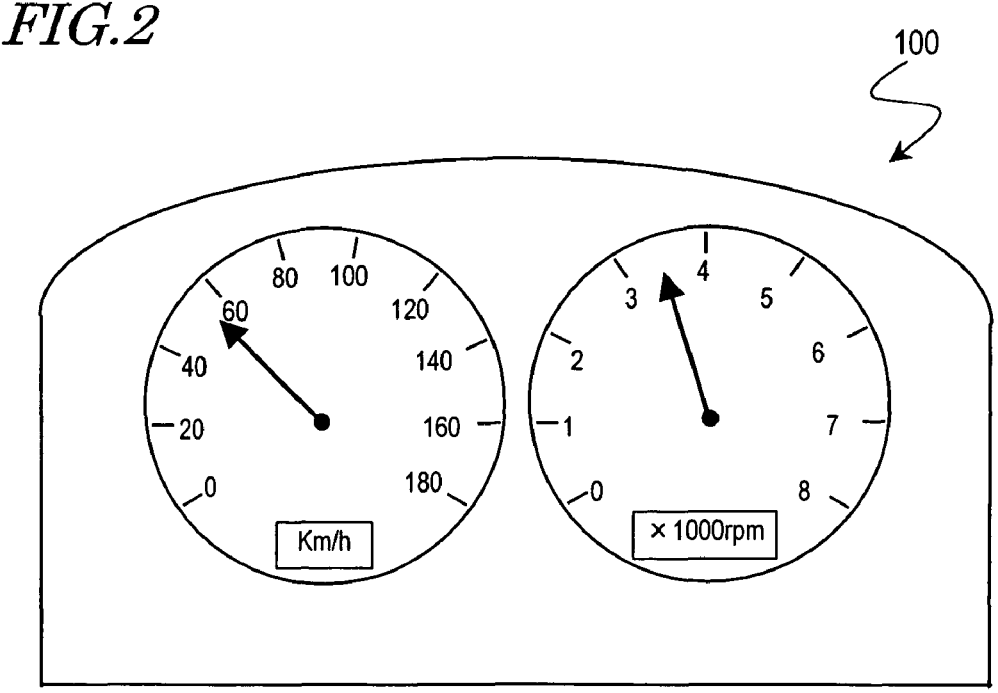
FIG. 2 is a diagram schematically showing a manner in which information may be displayed by the display device 100.

Referring to FIGS. 1 and 2, a display device 100 according to the present preferred embodiment will be described. FIG. 1 is a block diagram schematically showing the display device 100. FIG. 2 is a diagram schematically showing a manner in which information may be displayed by the display device 100.

As shown in FIG. 1, the display device 100 preferably includes a display panel 10 for displaying information, and a driving circuit 20 for driving the display panel 10. The display device 100 is preferably a display device for an instrument panel to be mounted in an automotive vehicle but the present invention is in no way limited thereto. The display device 100 is capable of displaying various information, including information which is necessary for driving the automotive vehicle. Although FIG. 2 illustrates an exemplary case where the velocity of the automotive vehicle (shown on the left hand side of FIG. 2) and the revolution of the engine (shown on the right hand side of FIG. 2) are being displayed, it will be appreciated that the displayed information is not limited thereto. Alternatively, the remaining fuel amount, water temperature, remaining battery power, shift lever position, and/or any other related or material information may be displayed. Although FIG. 2 illustrates a displayed image resembling analog meters each having a dial and a needle, the displayed image may alternatively be in the form of a digital meter(s) on which changing numerical figures are shown with time.

The display panel 10 may be, for example, a liquid crystal display panel including a liquid crystal layer, an organic electroluminescence display panel including organic electroluminescence elements, or an inorganic electroluminescence display panel including inorganic electroluminescence elements. Any of various known types of display panels may be used.

Figure 3:
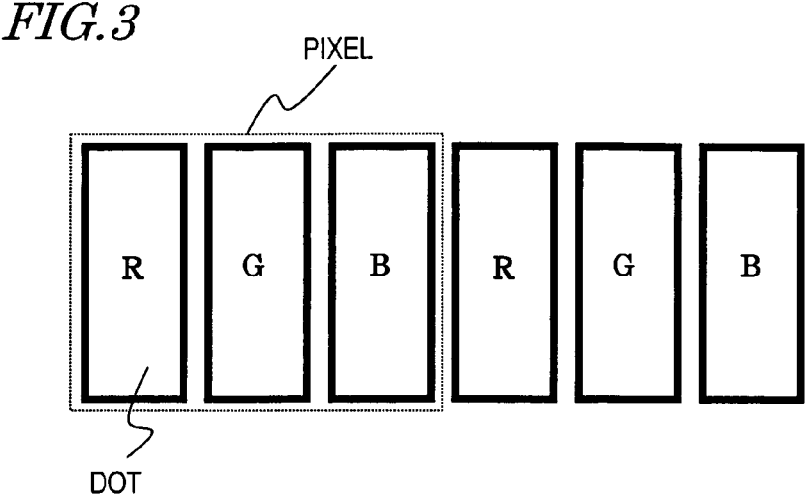
FIG. 3 is a diagram schematically showing an exemplary pixel structure for a display panel.

The display panel 10 includes a plurality of pixels arranged in a matrix configuration, each pixel including a first color dot corresponding to a first color, a second color dot corresponding to a second color, and a third color dot corresponding to a third color. A "pixel" defines a minimum unit of color displaying, whereas a "dot" is a minimum unit which allows its luminance to be independently controlled. FIG. 3 schematically shows a pixel included in the display panel 10 of the present preferred embodiment. As shown in FIG. 3, the pixel includes an R dot corresponding to a red color, a G dot corresponding to a green color, and a B dot corresponding to a blue color.

The driving circuit 20 preferably has a structure which conforms to the type of display panel 10. For example, in the case where the display panel 10 is an active matrix type liquid crystal display panel, the driving circuit 20 preferably at least includes a scanning line driving circuit for supplying a scanning signal to scanning lines in the display panel 10, and a signal line driving circuit for supplying a data signal to signal lines in the display panel 10.

The information to be displayed on the display panel 10 includes information which is displayed statically and information which is displayed dynamically. In the exemplary case of FIG. 2, the portions resembling needles of analog meters are displayed dynamically, whereas the background portion, including the portions resembling dials, is preferably shown statically.

Conventional display devices have a problem in that dots corresponding to any portion which is displayed statically continue to be displayed at the same luminance, with no regard to a lapse of display time, thus resulting in burn-in of images.

The driving circuit 20 included in the display device 100 of the present invention is capable of changing, with a lapse of display time, the displayed color of information which is displayed statically on the display panel 10. Since the displayed color is changed, the luminance of each of the dots corresponding to R, G, and B also changes. As a result, the display device 100 of various preferred embodiments of the present invention prevents burn-in of images. Thus, the display device 100 of various preferred embodiments of the present invention prevents burn-in of images based on changes in displayed color, without having to change the displayed position of information with a lapse of display time. This prevents the distraction and confusion of the user, and the delayed or unsuccessful delivery of information associated with the technique disclosed in Japanese Laid-Open Patent Publication No. 2003-177715, supra.

As used in the present specification, a "static" manner of display does not necessarily refer to a situation where overwriting is absolutely impossible (as on a printed, hard copy material), but rather encompasses any situation characterized by the absence of overwriting for at least a certain period of time. More specifically, a "static" manner of display refers to a situation where overwriting of a display does not occur for such a long time that, if the displayed color were not changed, burn-in of images would presumably occur (e.g., approximately 10 minutes or more).

Figure 4:
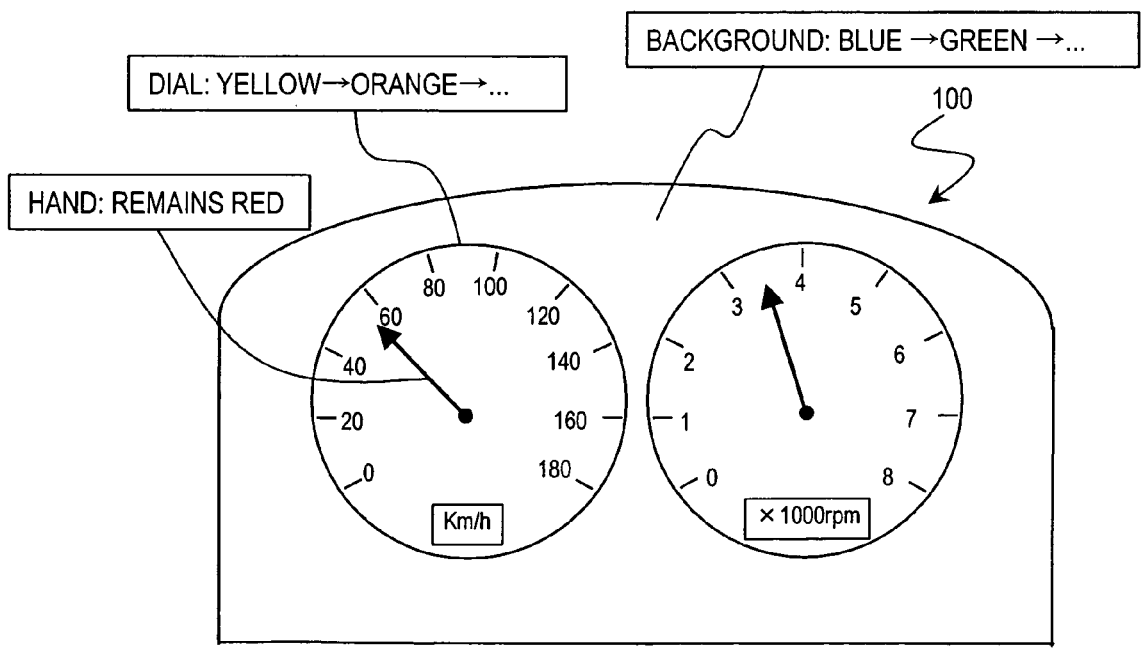
FIG. 4 is a diagram showing exemplary changes in displayed color.

Exemplary changes in displayed color are shown in FIG. 4. In the example shown in FIG. 4, the displayed colors at the beginning of display are such that the background is blue, the dials are yellow, and the needles are red, for example. However, the statically-displayed background and dials change in color from blue to green, and from yellow to orange, respectively, with the lapse of display time. As more time elapses, green and orange may further change to respectively different colors. Meanwhile, the dynamically-displayed needles preferably remain red, irrespective of the lapse of display time.

It is preferable that any change in the displayed color of statically-displayed information occurs only to an extent that the driver will experience no confusion or distraction due to the change in color.

Figure 5:
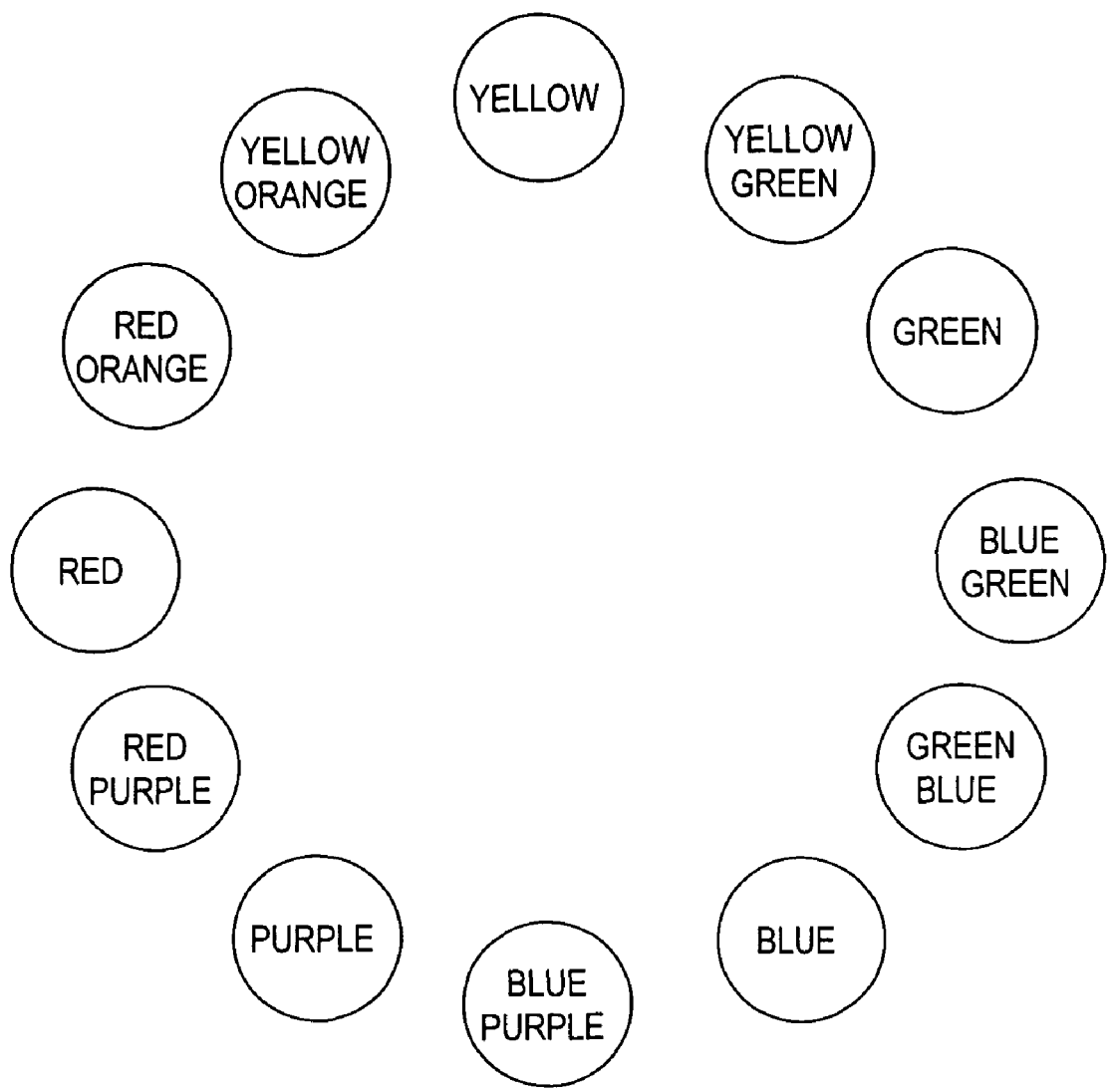
FIG. 5 shows a color wheel which represents changing hues in cyclic positions.

For example, it is preferable that the change in any displayed color is performed between colors whose coloration (hue) is relatively close to each other. FIG. 5 shows a color wheel which represents changing hues in cyclic positions. By allowing the displayed color to change between colors on the color wheel that are as close as possible (e.g., between adjacent colors), distraction and confusion of the viewer can be minimized. Moreover, distraction and confusion of the viewer can be reduced by allowing the displayed color to change so as to cycle on the color wheel.

Furthermore, it is preferable to allow the displayed color to change gradually or continuously. For example, in the case where the displayed color is to be changed between adjacent colors on the color wheel shown in FIG. 5, the viewer will experience no distraction or confusion as a result of effecting the color changes over a period of about 30 seconds or more.

The foregoing description has illustrated preferable examples of changes in displayed color on the basis of a color wheel. Next, preferable examples of changes in displayed color will be further described from a different point of view, with reference to FIG. 6.

Figure 6:
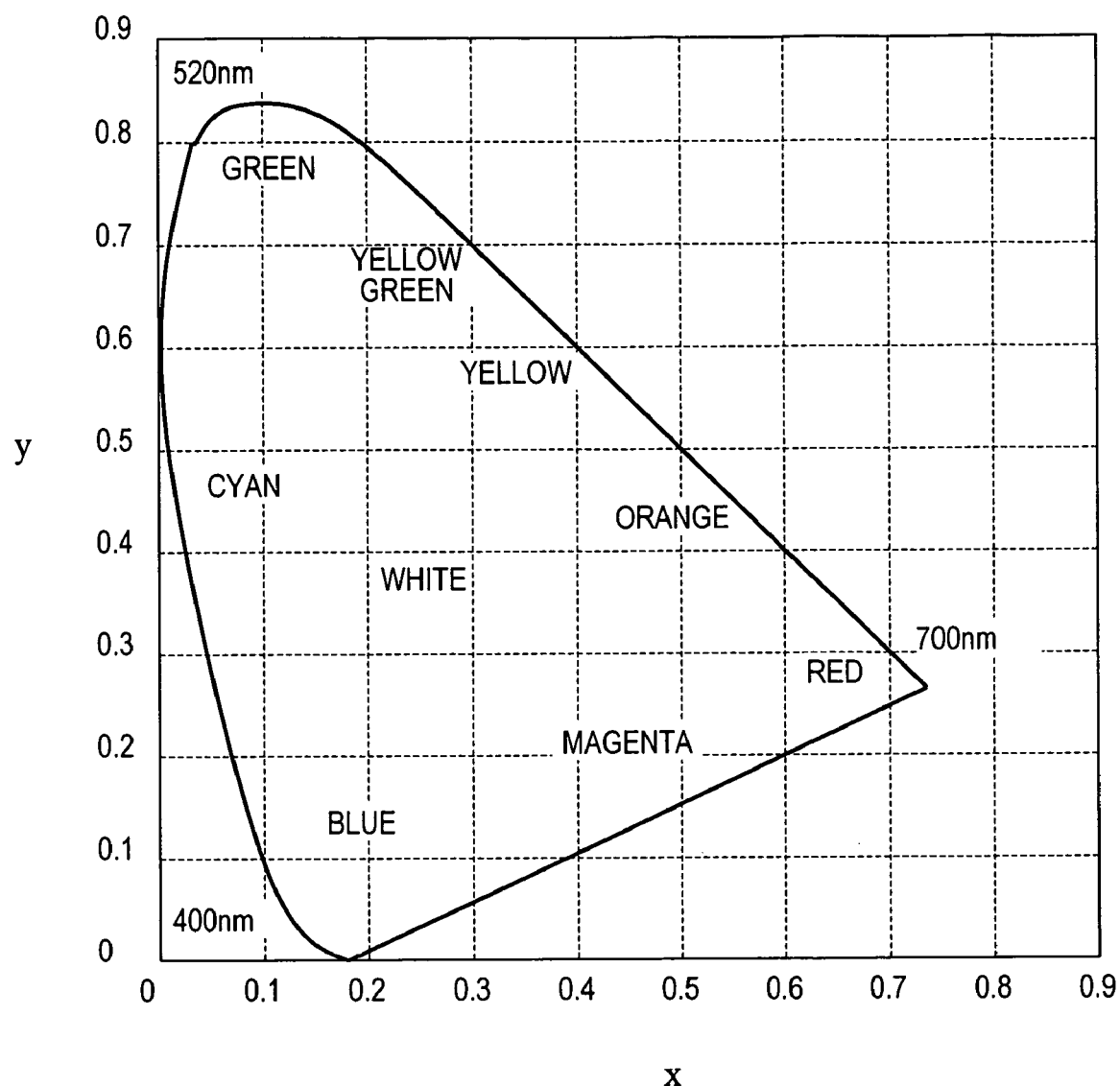
FIG. 6 is an xy chromaticity diagram in an XYZ calorimetric system.

FIG. 6 is an xy chromaticity diagram of the XYZ colorimetric system. Tristimulus values X, Y, and Z of the XYZ colorimetric system are expressed by the following equations:

$$X=2.7689R+1.7517G+1.1302B;$$

$$Y=R+4.5907G+0.0601B; \text{ and}$$

$$Z=0.0565G+5.5943B.$$

Herein, R, G, and B are tristimulus values of the RGB colorimetric system, representing the amounts of stimulation received by cone cells of the human brain in response to light of red (R), green (G), and blue (B), respectively.

As can be seen from FIG. 6 as well as the above equations, the stimulus value X largely depends on the red stimulus value R, the stimulus value Y largely depends on the green stimulus value G, and the stimulus value Z largely depends on the blue stimulus value B. On the other hand, the stimulus value X also contains the green stimulus value G and the blue stimulus value B, the stimulus value Y also contains the red stimulus value R and the blue stimulus value B, and the stimulus value Z also contains the green stimulus value G. Therefore, in the case where the luminance of a dot of a given color is lowered, the changes in the stimulus values X, Y, and Z can be decreased by increasing the luminances of the dots of the other colors, whereby distraction and confusion of the viewer is minimized. For example, in the case where the luminance of the R dot (corresponding to red) is lowered, the changes in the tristimulus values X, Y, and Z due to the lowered luminance of the R dot can be somewhat reduced by increasing the luminances of the G dot and the B dot, thus eliminating distraction and confusion.

A change in displayed color can be effected simply by changing the luminance of only one of the R dot, the G dot, and the B dot. However, from the aforementioned standpoint of elimination of distraction and confusion, it is preferable that the changes in the tristimulus values X, Y, and Z that are caused by a change in the luminance of one of the R dot, the G dot, and the B dot be compensated for by also changing the luminances of the other two dots.

Next, with reference to FIGS. 7A, 7B, and 7C, changes in the luminance of each pixel when the displayed color is changed will be described.

Figure 7A:
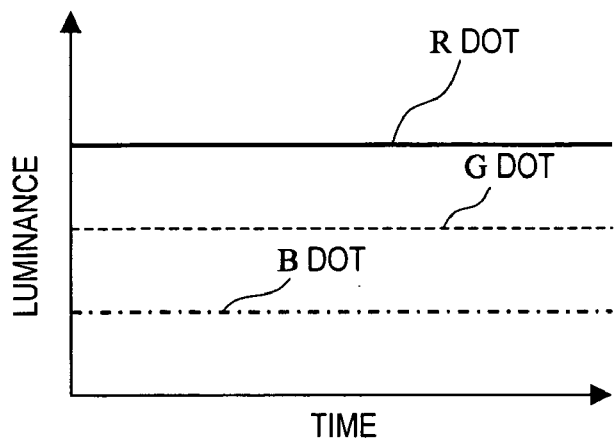
FIG. 7A is a graph schematically showing changes in the luminance of a pixel when the displayed color is not changed.

First, in the conventional case where the displayed color of statically-displayed information is not changed, as shown in FIG. 7A, the luminances of the R dot, the G dot, and the B dot do not change with the lapse of time.

On the other hand, in accordance with the display device 100 of a preferred embodiment of the present invention, the displayed color of statically-displayed information is changed with lapse of time. Therefore, as shown in FIG. 7B, the luminances of the R, G, and B dots also change with the lapse of time.

Figure 7B:
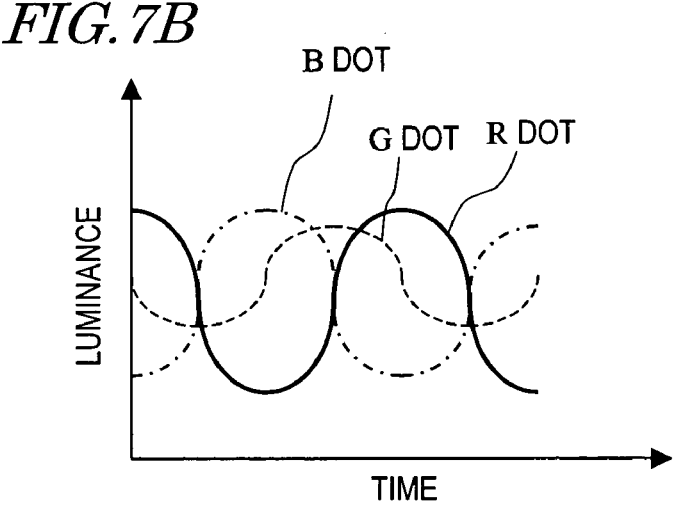
FIG. 7B is a graph schematically showing changes in the luminance of a pixel when the displayed color is gradually changed.

FIG. 7B illustrates a case where gradual changes in displayed color are effected, where the luminances of the respective dots are also gradually changed. FIG. 7C illustrates a case where discontinuous changes in displayed color are effected, where the luminances of the respective dots are also discontinuously changed.

From the standpoint of minimizing the awkwardness associated with changes in displayed color, it is preferable to effect gradual changes in displayed color, as shown in FIG. 7B. From the standpoint of facilitating the control of changes in displayed color, it is preferable to effect discontinuous changes in displayed color, as shown in FIG. 7C.

Figure 7C:
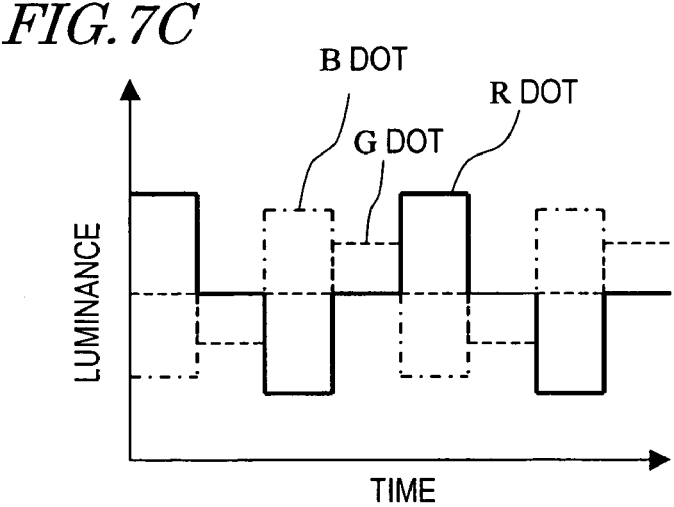
FIG. 7C is a graph schematically showing changes in the luminance of a pixel when the displayed color is discontinuously changed.

The schematic diagrams of FIGS. 7A, 7B, and 7C are merely intended for the purpose of illustrating changes in the luminances of the respective dots. It is to be understood that no technical meanings are attached to the absolute values of the luminances of the R, G, and B dots themselves, and the particular color which is determined as a result of the addition of the luminances of the R, G, and B dots illustrated herein.

Although the foregoing description has illustrated an example where, as exemplified in FIG. 4, the color of dynamically-displayed information (i.e., needles) is not to be changed, it would also be possible to change the color of any dynamically-displayed information with the lapse of display time.

A change in displayed color can be effected by supplying a predetermined driving signal from the driving circuit 20 to the display panel 10. In a conventional display device, the same level of display signal is retained in the dots in any region of the display area which displays a static image. In contrast, in the display device 100 according to a preferred embodiment of the present invention, the level of the display signal to be retained by the dots in the region which displays a static image changes with the lapse of time. In other words, changes in displayed color can be effected by varying the display signal voltages which are supplied from the driving circuit 20 to the R dot, the G dot, and the B dot.

Figure 8:
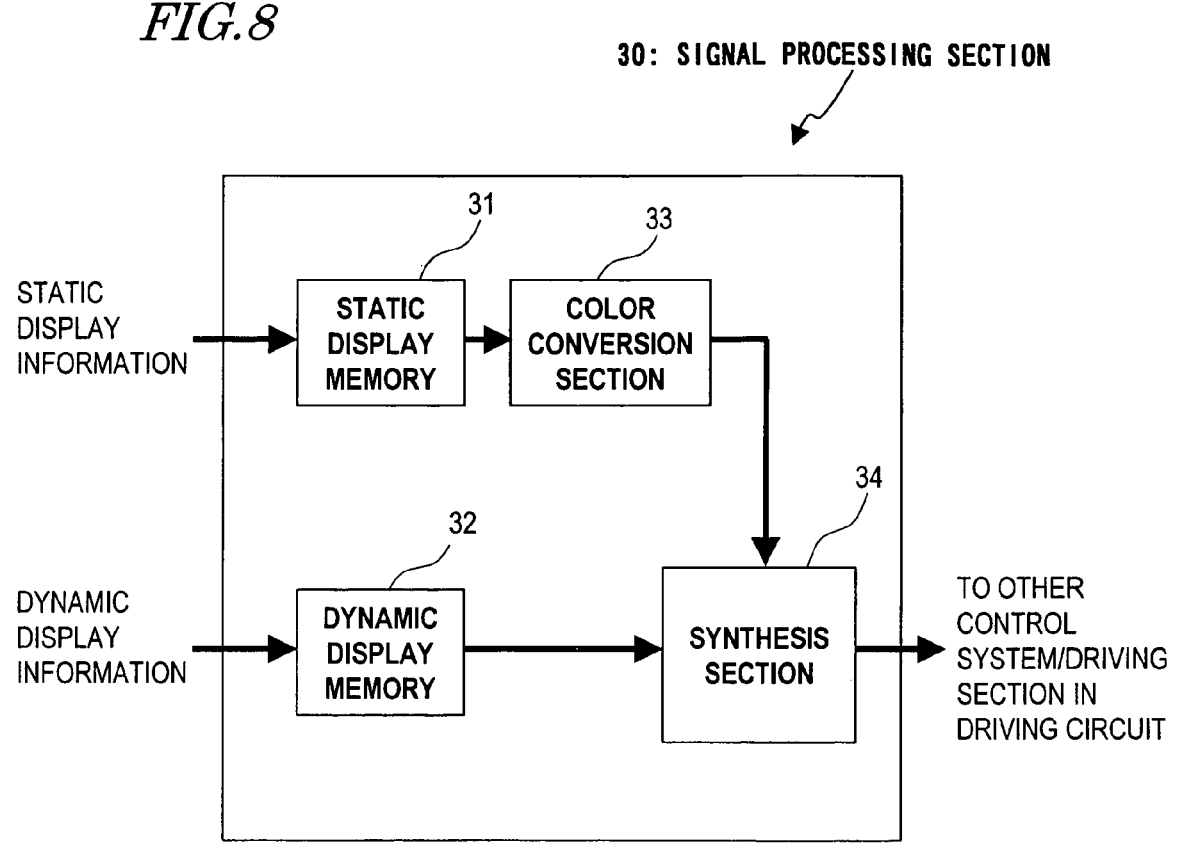
FIG. 8 is a block diagram schematically showing the structure of a signal processing section included in a driving circuit.

A specific exemplary structure of the driving circuit 20 for realizing such driving will be described with reference to FIG. 8. The driving circuit 20 (FIG. 1) may include, for example, a scanning line driving circuit, a signal line driving circuit, and a control circuit (timing generator) for controlling such circuits, as well as a signal processing section 30 as shown in FIG. 8.

The signal processing section 30 preferably includes a static display memory 31 arranged to store information to be statically displayed by the display panel 10, a dynamic display memory 32 arranged to store information to be dynamically displayed by the display panel 10, a color conversion section 33 arranged to change the displayed color of the information to be statically displayed by the display panel 10, and a synthesis section 34 arranged to merge the information to be statically displayed with the information to be dynamically displayed.

Out of the information which is input to the signal processing section 30, any information to be statically displayed is sent and stored to the static display memory 31, whereas any information to be dynamically displayed is sent and stored to the dynamic display memory 32. The information which has been stored to the static display memory 31 is sent to the color conversion section 33, where the displayed color of the information is changed. The color conversion section 33 may be, for example, a hue conversion section which changes the hue of the displayed color. Thereafter, the information to be statically displayed and the information to be dynamically displayed are merged by the synthesis section 34, and output to another control system and a driving section (e.g., the aforementioned timing generator) within the driving circuit 20.

With the signal processing section 30 as described above, it is possible to change the displayed color of the information which is to be statically displayed. Although FIG. 8 illustrates the color conversion section 33 as being interposed between the static display memory 31 and the synthesis section 34, it is also be possible to provide the color conversion section 33 before the static display memory 31, so that the information which has been subjected to a color change by the color conversion section 33 is then stored in the static display memory 31. The signal processing section 30 may be formed integrally with any other component element in the driving circuit 20, or may be formed as a separate unit.

Figure 9:
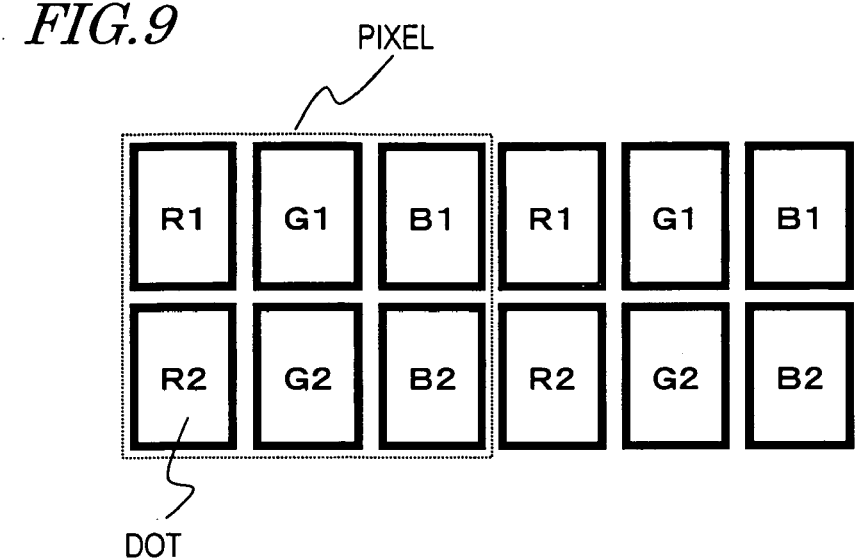
FIG. 9 is a diagram showing another exemplary pixel structure for a display panel.

Although FIG. 3 illustrates a structure in which each pixel is preferably composed of three dots (an R dot, a G dot, and a B dot), the pixel structure is not limited thereto. For example, as shown in FIG. 9, each pixel may be composed of six dots (two R dots, two G dots, and two B dots). In the case where monochromatic display (i.e., by only using dots pertaining to a single color) is to be performed with such a pixel structure, basically, the two R dots R1 and R2 will be used for red; the two G dots G1 and G2 will be used for green; and the two B dots B1 and B2 will be used for blue. Therefore, when changing the displayed color in monochromatic display, any change in the stimulus values which is caused by a change in the luminance of one of the two dots pertaining to a given color (e.g., one of the R dots R1) can be compensated for by effecting a change in the luminance of the other (e.g., the other R dot R2), without having to involve dots of any other color.

Figure 10:
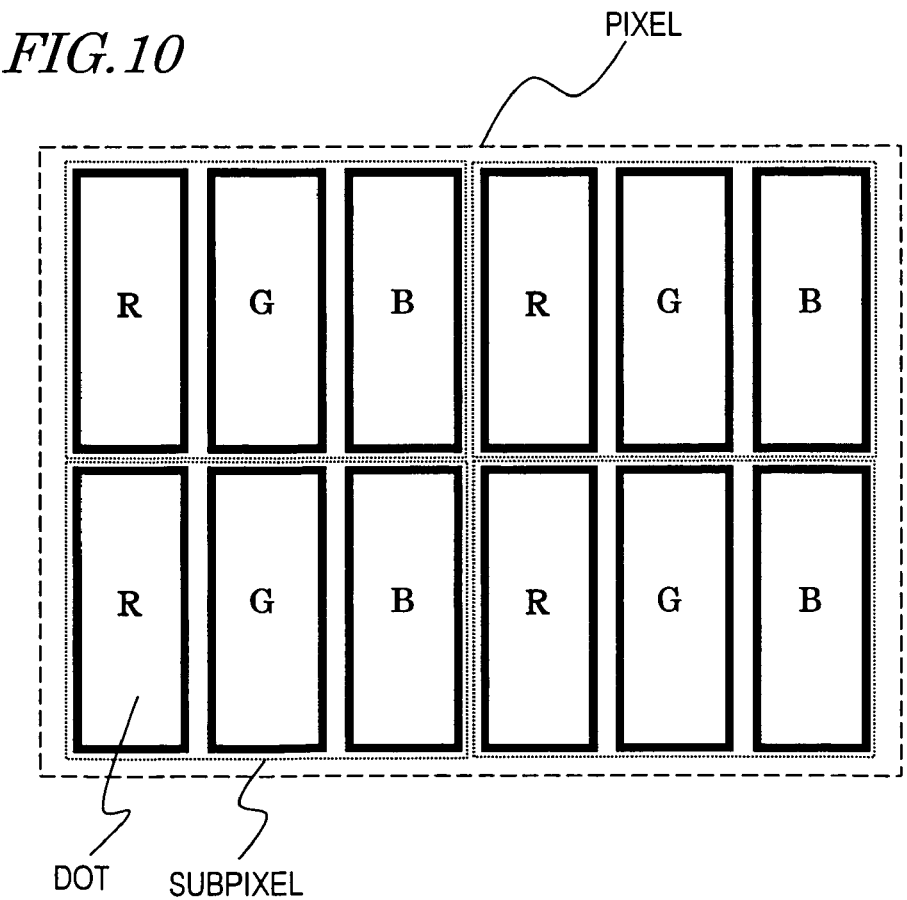
FIG. 10 is a diagram showing still another exemplary pixel structure for a display panel.

Moreover, it is possible to perform a so-called spatial dithering process in a display device according to a preferred embodiment of the present invention. FIG. 10 is a diagram showing a pixel structure for performing a spatial dithering process. In the structure shown in FIG. 10, one pixel is divided into four subpixels, each subpixel including an R dot, G dot, and a B dot. A spatial dithering process is a technique of gray scale expression in a spatial (areal) manner, where a total of the gray scale levels of a plurality (e.g., four) of subpixels defines the gray scale level of the entire single pixel. Therefore, by using a spatial dithering process, it becomes possible to increase (e.g., a fourfold increase) the number of gray scale levels that can be displayed with a single pixel.

In the structure which allows for a spatial dithering process as shown in FIG. 10, when changing a displayed color in order to prevent burn-in of images, it is possible to compensate for any change in the stimulus values which is caused by a change in the luminance of a given subpixel within a single pixel, by effecting a change in the luminance of another subpixel. For example, a change in the stimulus values which is caused by a change in the luminance of the R dot of a given subpixel can be compensated for by a change in the luminance of the R dot of another subpixel. Therefore, the luminance of each dot can be changed by a greater amount than in the case where a change in the stimulus values which is caused by a change in the luminance of a dot(s) of a given color is compensated for by a change in the luminance of a dot(s) of another color. As a result, there is provided an enhanced burn-in prevention effect. Note that the aforementioned technique of compensating for stimulus values changes on a "between subpixels" basis could also be combined with a technique of compensating for stimulus values changes within each subpixel.

In the structure as shown in FIG. 10, the gray scale levels displayed by the R dots, the G dots, and the B dots that are included in a pixel which is displaying information in a static manner may be switched between subpixels with the lapse of display time. Thus, it becomes possible to change the luminances of the dots without changing the displayed color of the entire single pixel. In this case, burn-in of images can be prevented without causing the viewer to be distracted or confused at all.

Although FIG. 10 illustrates an example where one pixel includes four subpixels, a spatial dithering process can be performed without requiring each pixel to include four or more subpixels. For example, a spatial dithering process can also be performed in the pixel structure shown in FIG. 9. Specifically, one subpixel may be defined by the R dot R1, G dot G1, and B dot B1, while another subpixel may be defined by the other R dot R2, G dot G2, and B dot B2, thus increasing the number of displayable gray scale levels by a factor of two. In addition, a change in the stimulus values which is caused by a change in the luminance of one subpixel can be compensated for by a change in the luminance of another subpixel. Furthermore, by switching the displayed gray scale levels between these subpixels, it becomes possible to prevent burn-in of images without changing the displayed color of the entire pixel.

As described above, the display device 100 according to a preferred embodiment of the present invention can prevent burn-in of images without causing a delayed delivery of information, and therefore is suitably used for an instrument panel of an automotive vehicle. As used herein, an "automotive vehicle" may be any vehicle or machine which is capable of self propulsion and used for passenger or article transportation or moving of objects, e.g., a car, a motorbike, a bus, a truck, a tractor, an airplane, a motorboat, a vehicle for civil engineering use, a train, or the like. It will be appreciated that "automotive vehicles" are not limited to only those which are provided with internal combustion engines such as gasoline engines, but also encompass those provided with electric motors or other propulsion mechanisms.

Although the present preferred embodiment is directed to an example where the present invention is applied to a display device for an instrument panel, the present invention is not limited thereto. A display device according to a preferred embodiment of the present invention can prevent burn-in of images without causing a delayed delivery of information, and therefore is suitably used also as a display device for amusement purposes or any other purpose in which display of information is required. In the case of a display device for an instrument panel, it is preferable that any change in the displayed color of statically-displayed information be inconspicuous and not noticeable. However, in the case of a display device for amusement purposes, the change in displayed color does not need to be inconspicuous. In fact, changes in the displayed color with the lapse of display time may intentionally be made conspicuous, thus attaining certain aesthetic effects while also preventing burn-in of images. As used herein, "a display device for amusement purposes" may preferably be a display device which is produced for play, entertainment or pastime purposes, and may be a display device which is provided in, e.g., a video game machine, a pachinko apparatus, or a pachinko-slot machine. However, as mentioned above, the present invention is not limited to only a display device for an instrument panel or amusement purposes, and can be applied to any type of display device for any purpose.

According to various preferred embodiments of the present invention, burn-in of images can be prevented without causing a delayed delivery of information to a viewer. A display device according to preferred embodiments of the present invention is suitably used for an instrument panel of an automotive vehicle or for amusement purposes, but the present invention is not limited thereto.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the present invention that fall within the true spirit and scope of the present invention.

This non-provisional application claims priority under 35 USC §119(a) of Japanese Patent Application-No. 2004-125456 filed on Apr. 21, 2004, and Japanese Patent Application No. 2004-293688 filed on Oct. 6, 2004, the entire contents of which are hereby incorporated by reference.

What is claimed is:

1. A display device comprising:
a display panel for displaying information; and
a driving circuit arranged to drive the display panel; wherein
the driving circuit is capable of changing, with a lapse of display time, a displayed color of information which is statically displayed on the display panel;
the display panel includes a plurality of pixels arranged in a matrix configuration, and each of the plurality of pixels includes a first color dot corresponding to a first color, a second color dot corresponding to a second color, and a third color dot corresponding to a third color;
the change in the displayed color is effected by varying display signal voltages supplied from the driving circuit to the first color dot, the second color dot, and the third color dot;
the first color dot is an R dot corresponding to a red color, the second color dot is a G dot corresponding to a green color, and the third color dot is a B dot corresponding to a blue color, and the change in the displayed color is effected so as to compensate for a change in tristimulus values X, Y, and Z of the XYZ colorimetric system caused by a change in the luminance of one of the R dot, the G dot, and the B dot, the compensation being made by a change in the luminances of the other two of the R dot, the G dot, and the B dot; and
the displayed color is changed between adjacent colors on a color wheel.

2. The display device of claim 1, wherein the driving circuit is capable of effecting the change in the displayed color in a discontinuous manner.

3. The display device of claim 1, wherein the driving circuit is capable of effecting the change in the displayed color in a gradual manner.

4. The display device of claim 1, wherein the driving circuit does not change, with the lapse of display time, a displayed position of the information which is statically displayed on the display panel.

5. The display device of claim 1, wherein the driving circuit includes a first memory arranged to store information to be statically displayed on the display panel, a second memory arranged to store information to be dynamically displayed on the display panel, and a color conversion section arranged to change the displayed color of the information which is statically displayed on the display panel.

6. The display device of claim 1, wherein each of the plurality of pixels includes an additional first color dot corresponding to the first color, an additional second color dot corresponding to the second color, and an additional third color dot corresponding to the third color.

7. The display device of claim 1, wherein the display panel includes a plurality of pixels arranged in a matrix configuration, and each of the plurality of pixels includes a plurality of subpixels each including a first color dot corresponding to a first color, a second color dot corresponding to a second color, and a third color dot corresponding to a third color.

8. The display device of claim 1, wherein the display device is a display device for an instrument panel to be mounted in an automotive vehicle.

9. An instrument panel comprising the display device of claim 1.

10. An automotive vehicle comprising the instrument panel of claim 9.

11. The display device of claim 1, wherein the display device is a display device for an amusement device.

12. An amusement device comprising the display device of claim 1.

13. A display device comprising:
a display panel for displaying information; and
a driving circuit arranged to drive the display panel; wherein
the driving circuit includes a first memory arranged to store information to be statically displayed on the display panel, a second memory arranged to store information to be dynamically displayed on the display panel, and a color conversion section arranged to change a displayed color of information which is statically displayed on the display panel;
the display panel includes a plurality of pixels arranged in a matrix configuration, and each of the plurality of pixels includes a first color dot corresponding to a first color, a second color dot corresponding to a second color, and a third color dot corresponding to a third color;
the change in the displayed color is effected by varying display signal voltages supplied from the driving circuit to the first color dot, the second color dot, and the third color dot;
the first color dot is an R dot corresponding to a red color, the second color dot is a G dot corresponding to a green color, and the third color dot is a B dot corresponding to a blue color, and the change in the displayed color is effected so as to compensate for a change in tristimulus values X, Y, and Z of the XYZ colorimetric system caused by a change in the luminance of one of the R dot, the G dot, and the B dot, the compensation being made by a change in the luminances of the other two of the R dot, the G dot, and the B dot; and
the displayed color is changed between adjacent colors on a color wheel.

14. A display device comprising:
a display panel for displaying information; and
a driving circuit arranged to drive the display panel; wherein
the driving circuit is capable of changing, with a lapse of display time, a displayed color of information which is statically displayed on the display panel;
the display panel includes a plurality of pixels arranged in a matrix configuration, and each of the plurality of pixels includes a plurality of subpixels each including a first color dot corresponding to a first color, a second color dot corresponding to a second color, and a third color dot corresponding to a third color;
the first color dot is an R dot corresponding to a red color, the second color dot is a G dot corresponding to a green color, and the third color dot is a B dot corresponding to a blue color, and the change in the displayed color is effected so as to compensate for a change in tristimulus values X, Y, and Z of the XYZ colorimetric system caused by a change in the luminance of one of the plurality of subpixels, the compensation being made by a change in the luminance of another of the plurality of subpixels; and the displayed color is changed between adjacent colors on a color wheel.

15. A display device comprising:

a display panel for displaying information; and a driving circuit arranged to drive the display panel; wherein the display panel includes a plurality of pixels arranged in a matrix configuration;

each of the plurality of pixels includes a plurality of subpixels each including a first color dot corresponding to a first color, a second color dot corresponding to a second color, and a third color dot corresponding to a third color;

the driving circuit switches, with a lapse of display time, gray scale levels displayed by the first, second, and third color dots included in at least one of the plurality of pixels which is statically displaying information, between the plurality of subpixels; and the displayed color is changed between adjacent colors on a color wheel;

the first color dot is an R dot corresponding to a red color, the second color dot is a G dot corresponding to a green color, and the third color dot is a B dot corresponding to a blue color, and the change in the displayed color is effected so as to compensate for a change in tristimulus values X, Y, and Z of the XYZ colorimetric system caused by a change in the luminance of one of the R dot, the G dot, and the B dot, the compensation being made by a change in the luminances of the other two of the R dot, the G dot, and the B dot; and the displayed color is changed between adjacent colors on a color wheel.

16. The display device of claim 15, wherein the display device is a display device for an instrument panel to be mounted in an automotive vehicle.

17. An instrument panel comprising the display device of claim 15.

18. An automotive vehicle comprising the instrument panel of claim 17.

19. The display device of claim 15, wherein the display device is a display device for an amusement device.

20. An amusement device comprising the display device of claim 15.

21. A method for driving a display device having a display panel for displaying information, the method comprising:

a first step of statically displaying information in a first portion of the display panel and dynamically displaying information in a second portion of the display panel; wherein the first step includes a second step of changing, with a lapse of display time, a displayed color of the information which is statically displayed in the first portion of the display panel;

the display panel includes a plurality of pixels arranged in a matrix configuration, each of the plurality of pixels includes an R dot corresponding to a red color, a G dot corresponding to a green color, and a B dot corresponding to a blue color, and the second step is performed so as to compensate for a change in tristimulus values X, Y, and Z of the XYZ colorimetric system caused by a change in the luminance of one of the R dot, the G dot, and the B dot, the compensation being made by a change in the luminances of the other two of the R dot, the G dot, and the B dot; and the displayed color is changed between adjacent colors on a color wheel.

22. The display device driving method of claim 21, wherein the second step is performed so that the displayed color is changed discontinuously.

23. The display device driving method of claim 21, wherein the second step is performed so that the displayed color is changed gradually.

24. The display device driving method of claim 21, wherein the second step is performed so that a displayed position of the information which is statically displayed on the display panel is not changed with the lapse of display time.

25. A method for driving a display device having a display panel for displaying information, the method comprising:

a first step of statically displaying information in a first portion of the display panel and dynamically displaying information in a second portion of the display panel; wherein the first step includes a second step of changing, with a lapse of display time, a displayed color of the information which is statically displayed in the first portion of the display panel;

the display panel includes a plurality of pixels arranged in a matrix configuration, each of the plurality of pixels includes a plurality of subpixels each including an R dot corresponding to a red color, a G dot corresponding to a green color, and a B dot corresponding to a blue color, and the second step is performed so as to compensate for a change in tristimulus values X, Y, and Z of the XYZ colorimetric system caused by a change in the luminance of one of the plurality of subpixels, the compensation being made by a change in the luminance of another of the plurality of subpixels; and the displayed color is changed between adjacent colors on a color wheel.

26. A method for driving a display device having a display panel for displaying information, wherein the display panel includes a plurality of pixels arranged in a matrix configuration, and each of the plurality of pixels includes a plurality of subpixels each including a first color dot corresponding to a first color, a second color dot corresponding to a second color, and a third color dot corresponding to a third color, the method comprising:

a first step of statically displaying information in a first portion of the display panel and dynamically displaying information in a second portion of the display panel; wherein the first step includes a second step of switching, with a lapse of display time, gray scale levels displayed by the first, second, and third color dots included in at least one of the plurality of pixels which is statically displaying information, between the plurality of subpixels;

the display panel includes a plurality of pixels arranged in a matrix configuration, each of the plurality of pixels includes a plurality of subpixels each including an R dot corresponding to a red color, a G dot corresponding to a green color, and a B dot corresponding to a blue color, and the second step is performed so as to compensate for a change in tristimulus values X, Y, and Z of the XYZ colorimetric system caused by a change in the luminance of one of the plurality of subpixels, the compensation being made by a change in the luminance of another of the plurality of subpixels; and the displayed color is changed between adjacent colors on a color wheel.

* * * * *